Figure 1:

United States Patent [19]

Kuehnle

[11] Patent Number: 4,846,887
[45] Date of Patent: Jul. 11, 1989

[54] PROCESS FOR THE PRODUCTION OF MICRONIZED WAXES

[75] Inventor: Adolf Kuehnle, Hoechster, Fed. Rep. of Germany

[73] Assignee: Huels Aktiengesellschaft, Marl, Fed. Rep. of Germany

[21] Appl. No.: 909,749

[22] Filed: Sep. 19, 1986

[30] Foreign Application Priority Data

Sep. 19, 1985 [DE] Fed. Rep. of Germany ....... 3533463

[51] Int. Cl.$^4$ ............................................. C09D 11/12
[52] U.S. Cl. ..................................... 106/31; 106/270
[58] Field of Search .................. 106/20, 288, 270, 31, 106/27, 30, 32

[56] References Cited

U.S. PATENT DOCUMENTS 3,441,628 4/1969 Ratzsch et al. ...................... 106/31

Primary Examiner—Josephine Barr
Attorney, Agent, or Firm—Millen, White & Zelano

[57] ABSTRACT

A microwax for use in printing ink and varnish systems is obtained by first spraying a wax melt to obtain a powder comprising substantially spherical particles, and subsequently grinding the powder of spherical particles.

14 Claims, 1 Drawing Sheet

PROCESS FOR THE PRODUCTION OF MICRONIZED WAXES

BACKGROUND OF THE INVENTION

This invention relates to waxes, a process for producing same as well as to compositions containing such waxes.

It is conventional to utilize waxes, for example, in printing ink and varnish systems in amounts of between 0.5 and 5% by weight, based on the total weight of the system, in order to attain or improve certain properties in printing inks and varnishes.

Micronized waxes (i.e., waxes having a particle size in the micron (um) range) exhibit an advantage over non-micronized products in that they can be added either directly or in the form of a dispersion prepared in the cold state.

Two basic methods exist for the production of micronized waxes.

The first method is a spraying process wherein a hot, low-viscosity wax melt is forced through a nozzle and atomized into very fine wax droplets. During the subsequent cooling step, these wax droplets solidify to form spherical particles. If these particles do not as yet exhibit a particle fineness sufficient for the respective usage, a screening procedure follows which removes the coarse particles still contained therein.

The second method is a mere grinding process. In this procedure, waxes present in the form of pastilles, prills, scales or coarse wax powders, are micronized by means of special grinding installations, for example jet mills. Some of these mills are constructed so that only ground material having the desired particle size will leave the grinding chamber. Such mills have, so to speak, a screening unit integrated into the milling chamber.

Furthermore, series-arranged grinding units are known which bring the waxes to the desired grain size in various stages. Finally, milling unit-screening unit combinations are utilized as well wherein the coarse product screened out after the first grinding pass is immediately returned to the grinding chamber and brought to the desired particle fineness in a second grinding pass.

In the first mentioned spraying process, substantially spherical, regular particles having a small surface area are obtained. By substantially spherical is meant a more or less accomplished ball-form, whereby a small part of the particles may possess an ellipsoidic or short bar form, always having rounded contours. On the other hand, the grinding processes yield broken, irregular particles having a large surface area.

When added to printing ink or varnish compositions, spherical particles improve the non-sticking characteristics ("slip"), as well as abrasion resistance and scratch resistance, of printing ink films and varnish films formed by applying the compositions to substrates. With regard to these properties, spherical particles yield far better results than broken particles of the same wax body composition. Another advantage provided by the spherical particles is that due to their spherical and smooth surface, the particles impart a smooth surface to printing ink films and varnish films so that impinging light is reflected in such a way that almost no less of luster occurs due to the presence of the wax additive. In contrast thereto, ground products, i.e., broken particles, lead to disruptions in the surface of printing ink films and varnish films. Impinging light is reflected in a diffuse fashion resulting in a loss of luster that is high as compared with films containing spherical particles. Thus, broken particles produce a dulling effect in printing ink and varnish films.

A disadvantage associated with spherical particles is their poor wetting and dispersing properties in comparison to broken particles. The spherical particles are more difficult to wet than broken particles due to the smaller surface area of the former. On account of their spherical shape, they are also subjected to lower shear stress when being stirred into printing ink and varnish systems than broken particles, so that they are distributed in such systems only with great difficulty.

Micronized waxes, based on the same wax composition and the same particle size, when prepared by spraying tend to form agglomerates in printing ink and varnish systems to a far greater extent than micronized waxes when produced by grinding. For this reason, the addition of micronized wax powders produced by spraying to printing ink or varnish systems can frequently be accomplished only in a predispersed form whereas the micronized waxes obtained by grinding can, in most cases, be stirred directly into printing ink and varnish systems.

OBJECTS OF THE INVENTION

It is an object of the invention to provide a micronized wax which has the advantageous properties of spherical particles (i.e., good slip properties, abrasion resistance, and gloss values) combined with the advantageous properties of broken particles (i.e., good wettability and dispersibility).

Another object of this invention is to provide a process for producing a micronized wax having such properties.

Another object of this invention is to provide an improved printing ink composition.

Another object of the invention is to provide an improved varnish composition.

Upon further study of the specification and appended claims, further objects and advantages of this invention will become apparent to those skilled in the art.

SUMMARY OF THE INVENTION

It has been found, surprisingly, that a micronized wax produced by combining the processes of spraying and grinding exhibits the advantageous properties of the individual waxes produced by the separate processes.

Suitable waxes for use in this invention include but are not limited to natural waxes, mineral waxes, montan wax derivatives, fatty acid derivatives, amide waxes, Fischer-Tropsch waxes, and polyolefin waxes, as well as mixtures of such waxes. The melting points (determined according to the German Society for Fat Products, i.e., Deutsche Gesellschaft fuer Fettwissenschaft or DGF, M-III-3) of these waxes or wax mixtures range between 65° C. and 160° C. The penetration values (determined according to DGF M-III-9b) are less than 10 mm $10^{-1}$. The melt viscosities (measured at 150° C.) amount to less than 500 mPa s.

Spraying of the wax melt to obtain a fine powder composed of substantially spherical particles can be effected by means of a nozzle with a supply of air or an inert gas, preferably nitrogen, in a conventional way (e.g., atomization). Guideline operating temperatures for the spraying process are about 10°–200° C., preferably 50°–150° C., above the melting point of the wax or wax mixture. In practice, this means operating temperatures between 100° and 300 ° C., preferably between 50° and 150 ° C. The wax melt, atomized into fine droplets, can be cooled off by injecting air or an inert gas, preferably nitrogen, so that, either directly or after subsequent screening with a commercial screening device, a fine powder is generally obtained wherein 50-100% by weight, preferably 80-100% by weight, especially 90-100% by weight, of the particles are smaller than 48 μm, and 60-100% by weight, preferably 90-100% by weight, especially 99-100% by weight, of the particles are smaller than 96 μm. 90-100 % by weight, preferably 95-100 % by weight, of the particles are larger than 1 μm.

According to this invention, a powder composed of substantially spherical particles, in particular a powder as obtained by atomizing a wax melt is then subjected to a grinding process. The grinding units commercially available for micronizing waxes serve for the grinding step. Such units are preferably jet mills which can be operated with air, steam, or other gases.

The powder is suitably comminuted by the grinding step to such an extent that—as measured by the Cilas Laser Granulometer 715—95-100% by weight of the particles are smaller than 32 μm. Preferably, the material, after grinding, contains particles which are 80-100% by weight smaller than 24 um as compared to the particles of the sprayed starting material which were 50-100% by weight smaller than 48 μm. 80-100 % by weight are larger than 1 μm.

Figure 2:
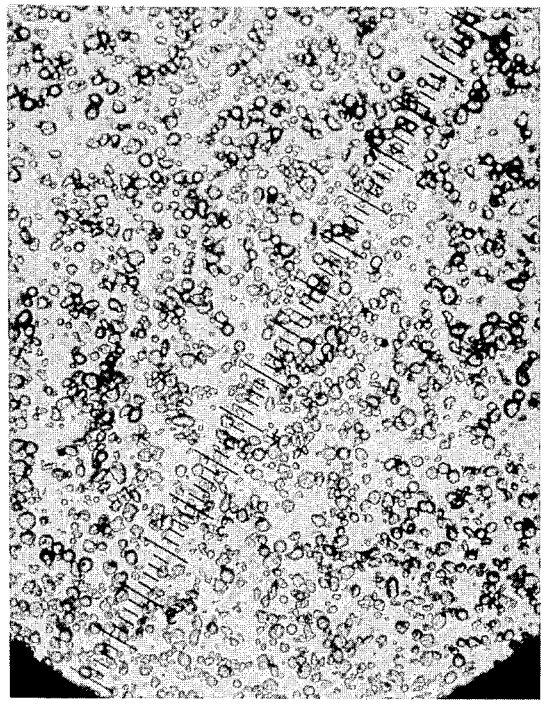

In particular, these values are, after grinding (measured by the Cilas Laser Granulometer 715):
 99.0-100% by weight smaller than 32 μm
 85.0-100% by weight smaller than 24 μm
 60.0-100% by weight smaller than 16 μm
 40.0-99% by weight smaller than 12 μm Before grinding, the powder is composed of particles which prossess different diameters. After grinding, the diameters are nearly the same, and substantially all of the particles exhibit at least 20 % of a spherical surface area coupled with at least 20 % non-spherical surface area. The attached figures are photomicrographs at a magnification of 200 fold (lineraric) of the waxes of this invention, produced according to example 2 b. FIG. 1 shows the sprayed powder, figure 2 the powder ground afterwards. In FIG. 2 it can be noticed that some of the particles exhibit sharp edges; most of the halvened balls rest on the freshly formed plain surface, however, and simulate an unchanged shape.

The micronized waxes produced according to this invention surprisingly exhibit not only ready dispersibility in printing ink and varnish systems but also improved surface qualities, such as slip effect, gloss, and abrasion resistance, of printing ink and varnish films.

For further details of the printing ink and varnish composition and the like for which the waxes of this invention are applicable, the following references are incorporated herein:

H. Kittel, "Lehrbuch der Lacke und Beschichtungen", Colomb Verlag 1976. Herein plenty of offset and intaglio printing inks are described, and similarly the waxes of this invention can be used in industrial varnishes, in laquers for furniture and wood, especially in nitrocellulose laquers.

Without being bound by an explanation of the unexpected results of this invention, it is believed that the progress is due to the particles retaining a partial spherical shape along with an increase in surface area and a more equal diameter, facts which seem to enable the particles to prefer a position in the laquer layer in which the spherical parts are turned to the surface.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight; unless otherwise indicated.

In the examples set out below, the grain sizes of the tested wax powders were determined by means of a measuring instrument from Cilas Company (i.e., Cilas Laser Granulometer 715).

Abrasion resistance and non-sticking effect, as well as gloss were tested and evaluated, respectively, in a toluene gravure printing ink having the following composition:

70 parts of resin solution (consisting of 51 parts of "Sheby" resin)
(Shebelio 68 139, produced from unsaturated hydrocarbons by Sheby Company, Benzons (France). in 49 parts of toluene)
 8 parts of pigment
 X parts of wax
 21 parts of toluene
 X=1: test for abrasion resistance
 X=5: visual evaluation of gloss and depth of color The abrasion resistance was determined with a device from Prufbau Company (Prufbau "Quartant" abrasion tester). In the examples, a higher number of strokes means that the sample has a higher abrasion resistance than a sample with a lower number of strokes.

The wettability and dispersing properties were tested in a commercially available nitrocellulose high-gloss lacquer. For this purpose, 50 g of nitro-cellulose lacquer and 0.5 g of micronized wax were shaken in an 100 ml glass bottle for two minutes. Subsequently, the agglomerate formation as well as a 100 μm coat of the lacquer on black test cards were analyzed by visually examination.

EXAMPLE 1

(a) A polyethylene hard paraffin having an osmometric molecular weight of 1,600, a density of 0.95 g/cm$^3$, and a liquefying point of 122 ° C., is sprayed or atomized at 220 ° C. and screened to obtain a powder having the following granular size:
 smaller than 32 μm: 100 % by weight
 smaller than 24 μm: 96.3% by weight
 smaller than 16 μm: 80.6% by weight
 smaller than 12 μm: 63.0% by weight
 smaller than 8 μm: 39.9% by weight (b) The polyethylene hard paraffin described in (a) is sprayed or atomized at 200° C. with a nozzle and screened, initially to a powder having the following granular size:
 smaller than 96 μm: 100 % by weight
 smaller than 48 μm: 93.9% by weight
 smaller than 32 μm: 74.2% by weight
 smaller than 24 μm: 51.1% by weight Thereafter this powder is ground with a jet mill to the following granular size: smaller than 32 μm: 100 % by weight smaller than 24 μm: 99.0% by weight
smaller than 16 μm: 84.2% by weight
smaller than 12 μm: 61.7% by weight
smaller than 8 μm: 36.4% by weight (c) The polyethylene hard paraffin disclosed under (a) in the form of wax pastilles is ground with a jet mill into powder having the following granular size:
smaller than 32 μm: 100 % by weight
smaller than 24 μm: 98.5% by weight
smaller than 16 μm: 91.1% by weight
smaller than 12 μm: 67.7% by weight
smaller than 8 μm: 37.6% by weight

| | Testing of (a), (b) and (c) in a Toluene Gravure Printing Ink: | | |
|---|---|---|---|
| | Sample | | |
| Properties | 1(a) | 1(b) | 1(c) |
| Abrasion Resistance | More Than 2,000 Strokes | More Than 2,000 Strokes | 600 Strokes |
| Perceived Gloss and Color Depth (Visual) | Standard | As 1(a) | Worse Than 1(a) and 1(b) |
| Testing of (a), (b), (c) in a Nitrocellulose Lacquer: | | | |
| Degree of Dispersion | 5 | 2 | 2 |
| 100 μm Coat Applied to Black Test Cards | 5 | 2 | 1 |

1 = very good
2 = good
3 = moderate
4 = not quite adequate
5 = poor

As can be seen, the three samples 1 (a), 1 (b) and 1 (c) possess nearly the same granular size distribution; only sample 1 (b), however, which is produced following this invention, gives coatings of high abrasion resistance, gloss, color depth and dispersion of the ingredients at the same time.

Preferably, the degree of dispersion is tested with a colorless varnish, for instance with a nitrocellulose laquer. These systems prossess a higher viscosity than printing inks and facilitate the formation of agglomerates thereby. As they are used for wood coatings mostly, they do not contain any pigments, and therefore they allow the visual examination.

On the other hand it is necessary to test the abrasion resistance and the gloss on pigmented ink compositions, which are printed on a paper and are tested by rubbing against a normal white paper under defined conditions, whereby the change of pigmented parts can be evaluated easily and the interaction between the pigment component and the micronized wax takes effect on the result.

EXAMPLE 2

(a) A synthetic hard paraffin having an osmometric molecular weight of 650, a density of 0.94 g/cm$^3$, and a liquefying point of 111° C., is sprayed or atomized at 180 C. and screened to yield a powder having the following grain size:
smaller than 24 μm: 99.9% by weight
smaller than 16 μm: 99.9% by weight
smaller than 12 μm: 93.2% by weight
smaller than 8 μm: 69.3% by weight
smaller than 6 μm: 49.1% by weight (b) The synthetic hard paraffin described in (a) is sprayed or atomized and screened at 170° C. initially to a powder having the following granular size:
smaller than 96 μm: 100 % by weight
smaller than 64 μm: 99.3% by weight
smaller than 48 μm: 99.3% by weight
smaller than 32 μm: 98.1% by weight
smaller than 24 μm: 96.9% by weight
smaller than 16 μm: 69.4% by weight
smaller than 12 μm: 44.4% by weight Then this powder is ground up with a jet mill to the following grain size:
smaller than 24 μm: 100 % by weight
smaller than 16 μm: 99.2% by weight
smaller than 12 μm: 95.5% by weight
smaller than 8 μm: 64.0% by weight
smaller than 6 μm: 43.7% by weight (c) The synthetic hard paraffin disclosed under (a) in the form of wax pastilles is ground with a jet mill into a powder having the following granular size:
smaller than 24 μm: 99.9% by weight
smaller than 16 μm: 96.7% by weight
smaller than 12 μm: 89.8% by weight
smaller than 8 μm: 61.3% by weight
smaller than 6 μm: 38.1% by weight

| | Testing of (a), (b) and (c) in a Toluene Gravure Printing Ink: | | |
|---|---|---|---|
| | Sample | | |
| Properties | 2(a) | 2(b) | 2(c) |
| Abrasion Resistance | 400 Strokes | 500 Strokes | 200 Strokes |
| Perceived Gloss and Color Depth (Visual) | Standard | As 2(a) | Worse Than 2(a) and 2(b) |
| Testing of (a), (b) and (c) in a Nitrocellulose Lacquer: | | | |
| Degree of Dispersion | 5 | 2 | 2 |
| 100 μm Coat Applied to Black Test Cards | 5 | 2 | 2 |

COMPARATIVE EXAMPLE 3

Testing of a 50 : 50 mixture from 1 (a) and 1 (c) in a Nitrocellulose lacquer and comparison with 1 (b); 1 % wax in both cases:

| | Sample | |
|---|---|---|
| Properties | 1 (a) + 1 (c) | 1 (b) |
| Degree of Dispersion | 4 | 2 |
| 100 μm Coat Applied to Black Test Cards | 4 | 2 |

COMPARATIVE EXAMPLE 4

Testing of a 50 : 50 mixture from 2 (a) and 2 (c) in a Nitrocellulose lacquer and comparison with 2 (b); 1 % wax in both cases:

| Properties | Sample 2(a) + 2(c) | 2(b) |
|---|---|---|
| Degree of Dispersion | 5 | 2 |
| 100 μm Coat Applied to Black Test Cards | 4 | 2 |

As can be seen, the properties of the waxes of the present invention are superior to those of a mixture of (a) the conventional substantially spherical material and (b) the conventional ground material.

The preceding examples can be repeated with similar success by substituting the generically or specifically described materials and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. A process for the production of a micronized wax powder comprising subjecting a starting material of substantially spherical wax particles, producible by spraying a wax melt, to a grinding step to yield a micronized wax powder wherein at least 95% by weight of the particles of said powder are smaller than 32 μm.

2. A process for the production of a micronized wax powder comprising the steps of:
   (a) spraying a wax melt to form a fine powder of predominantly spherical particles, wherein at least 60% by weight of the particles are smaller than 96 μm; and
   (b) grinding the particles produced by step (a).

3. A process according to claim 2, wherein the particles produced by step (a) are at least 50% by weight smaller than 48 μm.

4. A process according to claim 2, wherein the particles produced by step (b) are at least 95% by weight smaller than 32 μm.

5. A process according to claim 4, wherein the particles produced by step (b) are at least 80% by weight smaller than 24 μm.

6. A process according to claim 2, wherein the particles produced by step (b) are at least 80% by weight smaller than 24 μm.

7. A micronized wax powder produced in accordance with the process of claim 1.

8. A micronized wax powder produced in accordance with the process of claim 2.

9. A process for the production of a micronized was powder comprising grinding a starting material of substantially spherical wax particles sufficiently to yield a micronized wax powder possessing luster-retaining spherical particle characteristics and easily-dispersible broken particle characteristics, said substantially spherical wax particles being producible by spraying a wax melt, and at least 60% by weight of said substantially spherical wax particles are smaller than 96 μm.

10. A micronized wax powder produced in accordance with the process of claim 9.

11. A process according to claim 1, wherein said grinding step is conducted within a jet mill.

12. A process according to claim 2, wherein grinding step (b) is conducted within a jet mill.

13. A process according to claim 1, wherein said grinding is conducted sufficiently to yield a micronized wax powder possessing luster-retaining spherical particle characteristics and easily-dispersible broken particle characteristics.

14. A process according to claim 2, wherein said grinding is conducted sufficiently to yield a micronized wax powder possessing luster-retaining spherical particle characteristics and easily-dispersible broken particle characteristics.

* * * * *

UNITED STATES PATENT AND TRADEMARK OFFICE
CERTIFICATE OF CORRECTION

PATENT NO. : 4,846,887

DATED : July 11, 1989

INVENTOR(S) : ADOLF KUEHNLE

It is certified that error appears in the above-identified patent and that said Letters Patent is hereby corrected as shown below:

Title page 1, Foreign Application Priority Data:

reads "Sep. 19, 1985 [DE] Fed. Rep. of Germany ....... 3533463"

should read -- Sep. 19, 1985 [DE] Fed. Rep. of Germany .......
3533436

Signed and Sealed this

Seventeenth Day of April, 1990

Attest:

HARRY F. MANBECK, JR.

Attesting Officer     Commissioner of Patents and Trademarks